Jan. 11, 1927.

C. W. ROHOUR

SCREW RETAINER

Filed Feb. 8, 1926

1,613,906

INVENTOR.
CHRIS W. ROHOUR.

BY

ATTORNEYS.

Patented Jan. 11, 1927.

1,613,906

UNITED STATES PATENT OFFICE.

CHRIS W. ROHOUR, OF CONNERSVILLE, INDIANA, ASSIGNOR TO INDIANA LAMP CORPORATION, OF CONNERSVILLE, INDIANA, A CORPORATION.

SCREW RETAINER.

Application filed February 8, 1926. Serial No. 86,834.

This invention pertains to an element for securing an adjusting screw in position, whereby it will be held against longitudinal movement while permitting rotary movement for adjusting purposes. It is particularly adapted for use in connection with automobile lamps wherein the screw protrudes through the rear of the lamp casing, connecting with the lamp mounting for adjusting the focal position thereof.

The principal feature of the invention resides in the provision of a disk or ring having an annular centrally-positioned opening therein of slightly less diameter than the head of the screw through which the curved portion of the screw head may protrude for allowing access thereto with the screw driver, while at the same time preventing the movement of the screw outwardly. Said disk is provided with a plurality of prongs or projections extending through oppositely disposed openings in the casing or shell positioned on each side of the screw head, and are held in position by means of a coil spring or any other suitable means.

Figure 1:
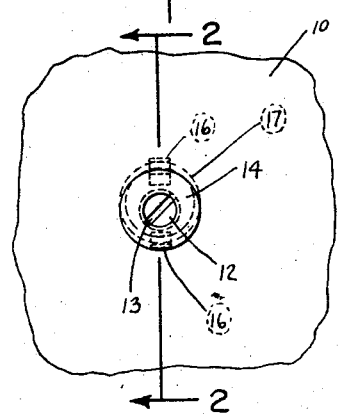
Figure 2:
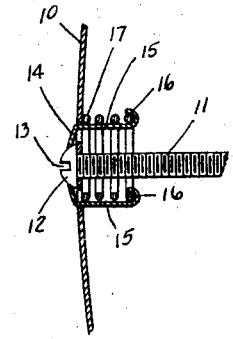
Figure 3:
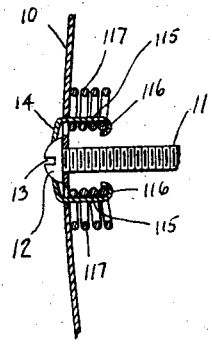
Figure 4:
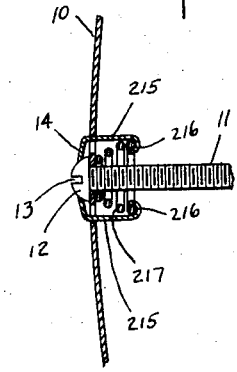

The full nature of the invention will be understood from the accompanying drawings and the following description and claims:

In the drawings Figure 1 is a plan view of the device. Fig. 2 is a section taken on the line 2—2 of Fig. 1. Fig. 3 is the same as Fig. 2, showing a modified form. Fig. 4 is the same as Figs. 2 and 3, showing a second modified form.

In the drawings there is shown a plate 10 which may be the rear of a lamp casing or any other similar member having an opening therethrough, through which a screw or bolt 11 may extend for any desired purpose, such as adjusting the focal position of a lamp bulb. The screw 11 is provided with the usual rounded head 12 having a slot 13 therein and is positioned on the exterior of the plate or casing 10 with the shank thereof extending through a suitable opening in said plate to the exterior.

For retaining the screw in position by holding the head against the plate or casing there is provided a cap formed with a disk-like portion 14 having a central opening of slightly less diameter than the head of the screw or bolt, said disk being adapted to fit over the head so as to embrace it, whereby access may be had to the groove 13. Said disk 14 is provided with a pair of prongs 15 formed integral therewith on opposite sides of its periphery, said prongs extending through suitable openings provided therefor in the disk or casing 10.

The ends of the prongs are turned upwardly as at 16 to receive a spiral compression spring 17 positioned intermediate the inner surface of the disk or casing 10 and the upturned ends 16 in which it is adapted to seat.

In the modified form illustrated in Fig. 3, there is provided a plurality of springs 117 adapted to be mounted so as to function in the same manner as the spring 17 illustrated in Fig. 2.

The modified form illustrated in Fig. 4 is provided with a single spring 217 positioned between the prongs 15 so as to function in the same manner as the spring illustrated in Fig. 2. It will be noted that in both Figs. 3 and 4, both prongs are turned inwardly, whereas in Fig. 2, one of the prongs is turned outwardly.

This device provides accessible and practical means of retaining a screw or bolt in position as well as giving the complete structure a neat and unusual appearance on the exterior.

The invention claimed is:

1. A supporting plate, a member to be removably secured thereto, a retaining cap having a portion thereon adapted to engage and clamp said member against said plate, prongs formed on said cap extending through said plate, and a spring member removably engaged by said prongs for securing said retaining cap in clamping position.

2. A supporting plate, a member having a head thereon engaging one side of said plate and a shank extending therethrough, a retaining cap adapted to embrace said head, and prongs formed on said cap extending through said plate on each side of said member for retaining said member in engagement with said plate, whereby said member will be held in position with respect to said plate so as to permit its rotation.

3. A supporting plate, a member adapted to be removably secured thereto, a retaining cap having a head thereon adapted to engage and clamp said member against said plate, a plurality of prongs formed on said cap and extending through said plate, and a spiral compression spring removably engaged between the ends of said prongs and said plate for yieldingly clamping said retaining cap and member thereto.

4. A supporting plate, a member having a head thereon and a shank extending through said plate, a retaining cap adapted to embrace said head, a plurality of prongs on said cap adapted to extend through said plate, and means on the opposite side of said plate for engaging said prongs and retaining said cap in position against said head.

5. A supporting plate, a screw bolt having a head thereon and a shank extending through said plate, a retaining cap adapted to embrace said head, a plurality of prongs on said cap adapted to extend through said plate, and a compression spring mounted intermediate said plate and the inner ends of said prongs for resiliently retaining said cap in engagement with said head.

6. A supporting plate, a screw bolt having a rounded grooved head thereon, and a shank extending through said plate, a retaining cap having an annular opening therein of slightly less diameter than said head through which a portion of said head is adapted to protrude for giving access to the groove therein, a plurality of prongs on said cap extending through said plate provided with hooked ends, and a compression spring mounted between said plate and the hooked ends of said cap so as to seat therein for resiliently retaining said cap in engagement with said head.

7. A supporting plate, a member having a head engageable by a tool for rotating the same, a shank extending through said plate, a retaining cap adapted to engage said head and having an opening therein of slightly less diameter through which a tool may be inserted for engaging and rotating said head, and means for securing said retaining cap to said plate for securing said member thereto while permitting its rotation.

8. A supporting plate, a member having a head engageable by a tool for rotating the same, a shank extending through said plate, a retaining cap adapted to engage said head and having an opening therein of slightly less diameter through which a tool may be inserted for engaging and rotating said head, a plurality of prongs on said cap extending through said plate, and a spring mounted thereon for resiliently retaining said cap in engagement with said head.

In witness whereof, I have hereunto affixed my signature.

CHRIS W. ROHOUR.